No. 813,415. PATENTED FEB. 27, 1906.
I. GERACI.
TAILOR'S MEASURE.
APPLICATION FILED FEB. 21, 1905.
Fig. 1.
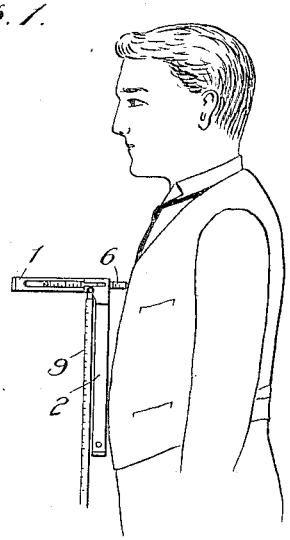
Fig. 2.
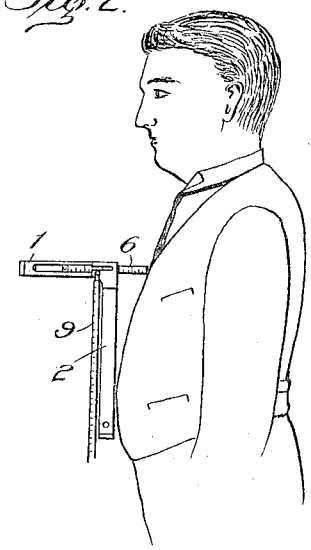
Fig. 3.
Fig. 4.
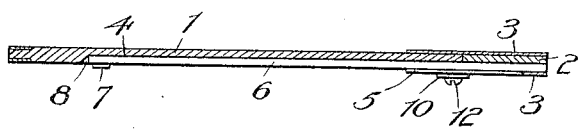
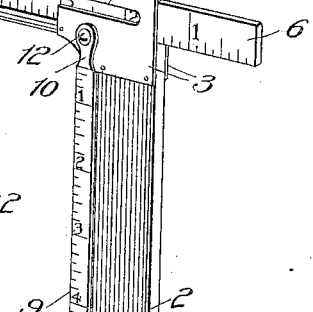
Fig. 5.
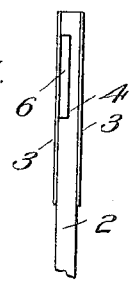
Witnesses
Edwin L. Bradford
Inventor
Ignatius Geraci
By J. Granville Meyers
Attorney

UNITED STATES PATENT OFFICE.

IGNATIUS GERACI, OF WASHINGTON, DISTRICT OF COLUMBIA, ASSIGNOR OF ONE-HALF TO CHARLES LINKINS, OF WASHINGTON, DISTRICT OF COLUMBIA.

TAILOR'S MEASURE.

No. 813,415.  Specification of Letters Patent.  Patented Feb. 27, 1906.

Application filed February 21, 1905. Serial No. 246,680.

*To all whom it may concern:*

Be it known that I, IGNATIUS GERACI, a citizen of the United States, residing at Washington, in the District of Columbia, have invented new and useful Improvements in Tailors' Measures, of which the following is a specification.

My present invention relates to certain new and useful improvements in tailors' measures, and more particularly to squares ordinarily employed by tailors in taking what are known as "short" measurements.

The prime purpose of the invention is to provide a tailor's square with means whereby the front slope measurements of coats and vests may be conveniently and accurately taken, so that when the designer and cutter lays out his pattern he will know exactly how much or how little slope to give to the front of the garment above the waist-line to cause the same to conform accurately and neatly to the human form, whether the latter be of slender, medium, or corpulent build.

In the prior Letters Patent granted to me on the 9th day of August, 1892, is shown and described one form of device for taking the measurements above referred to; but this device is not altogether satisfactory, since it is too cumbersome and expensive and not entirely accurate in its results. The present invention is therefore an improvement over this and other prior devices for the purpose, since it is simple in its construction, absolutely accurate in its results, and extremely cheap to manufacture.

Briefly and generally stated, the invention comprises a square or angle consisting of two arms arranged at right angles to each other and joined together, one arm of the square or angle carrying an extensible rule or scale mounted to slide thereon and parallel therewith, so that an end of the rule or scale may be projected to varying extents beyond the joint of the two arms or may be moved back to bring the said end flush with or behind the edge of the joint, where it will be entirely out of the way when the square is employed in taking the usual so-called "short" measurements.

The invention consists, further, in the features of construction and arrangement of parts herein shown and described and then definitely pointed out in the claims.

In order to enable others to make and use my said invention, I will now proceed to describe the same in detail, reference being had for this purpose to the accompanying drawings, in which—

Figure 1 is a side elevation of a human form of fairly slender build, showing the manner of using my improved square. Fig. 2 is a similar view showing a form of slightly heavier build. Fig. 3 is a perspective view of the device complete, the scale or rule being shown as slightly projected. Fig. 4 is a section taken on the line 4 4 of Fig. 3, and Fig. 5 is an end view looking in the direction of the joint of the two arms of the square.

My improved square consists of two arms 1 and 2, which are joined together at right angles to each other, as shown, the joint or angle being made firm and secure by the metal plates 3. The shorter arm 1 of the square is recessed or grooved in one face throughout substantially its entire length, as shown at 4, the said groove or recess at the angle or joint of the two arms being covered by one of the metal plates 3 for a purpose presently to be made apparent, and the said metal plate is provided with an elongated open slot 5, the function of which will shortly appear.

Fitted to slide freely in the said groove or recess 4 is a scale or rule 6, having delineated on one or both sides thereof lines and characters indicating inches and fractions thereof, as shown. This scale or rule is made of rigid material and is of such length that it may shield entirely within the groove in the arm 1 and may have one end extended or projected beyond the edge of the arm 2, so that it will extend at right angles thereto, but in a line parallel with the arm 1. At its inner end the scale or rule is provided with a finger-button or projection 7, which when the rule is entirely extended or projected will lie in the elongated open slot 5, but which will prevent the rule from being entirely withdrawn by said button or projection engaging the closed end wall of the slot. As will be apparent, the plate 3 will retain the rule in its groove and prevent separation of the parts, but at the same time will permit free relative movement thereof, so that the rule may be moved freely back and forth in its groove as occasion may require. I prefer to bevel off the end wall of the groove or recess 4, as shown at 8, in order to permit access of the finger or thumb nail of the operator between said wall and the end of the rule or scale, so as to assist in projecting or extending the latter.

In order to take the usual well-known short measurements with my improved square, a flexible tape-measure 9 is associated therewith, as shown. This tape-measure is attached to a metal clip or eyepiece 10, which is itself pivotally connected to the metal plate 3 by means of a screw or pin 12, the construction being such that the tape-measure may be swung to any position required incident to the particular measurement being taken.

In using my improved device to determine the exact amount of front slope to be given to the garment in order that it may accurately fit the human form and be properly draped it is only necessary to place the long arm 2 of the square in a vertical position at the front of the trunk of the person being fitted, as shown in Figs. 1 and 2, care being taken that the same is maintained in a true vertical line. Then while being thus held the fitter or draper forces the rule or scale outward until the end thereof contacts with the body of the person. A note is then made of the exact distance the rule or scale has been extended, and in laying out his pattern or diagram the cutter takes this distance into account and cuts his goods accordingly, so that the exact amount of front slope required is obtained, and the garment when completed is sure to follow and accurately fit the contour of the human form from which the measurements were taken.

I do not wish to be understood as limiting myself to the precise construction and arrangement of parts herein described, as I am aware that changes may be made without departing from the spirit of the invention as defined in the appended claims: For instance, it is not absolutely necessary that the supplemental rule or scale be located in a groove or recess formed in one arm of the square, it being obvious that the same may be otherwise mounted in sliding engagement with said arm.

What I claim is—

1. A tailor's measure, comprising a square having two arms, one of which is provided with a longitudinally-extending facial groove, a plate covering a part of the groove at the angle of the square, and a rule slidably mounted in said facial groove and adapted to have one end projected beyond the outer edge of the angle between the two arms of the square and also adapted to be moved back in the groove to bring its outer end substantially flush with said edge.

2. As an article of manufacture, a tailor's measure for taking short and slope measurements, comprising a square having two arms, one of which is provided with a longitudinally-extending facial groove, a plate covering a part of the groove, a rule slidably mounted in said groove and retained therein by said plate, said rule being adapted to have one end projected beyond the outer edge of the angle between the two arms and to be moved back to bring said end substantially flush with said edge, and a flexible tape-measure loosely connected at one end to said angle.

3. A tailor's measure, comprising a square having two normal arms, one of which is provided with a longitudinally-extending facial groove, a rule slidably mounted in said groove and adapted to have one end thereof projected beyond the outer edge of the angle between the two arms of the square and also adapted to be moved back in the groove to bring its outer end substantially flush with said edge, and means at opposite ends of the groove to limit the sliding movement of the rule in both directions.

4. A tailor's measure, comprising a square having two arms, one of which is provided with a facial groove extending throughout nearly its entire length, a rule of less length than said arm slidably mounted in the groove and adapted to have one end projected beyond the outer edge of the angle between the two arms of the square and also adapted to be moved back in said groove, and a flexible tape-measure loosely connected at one end to said square at a point adjacent the inner angle thereof.

5. A tailor's measure comprising a square having two arms, one of which is provided with a facial groove extending throughout nearly its entire length, a rule of less length than said arm slidably mounted in the groove and adapted to have one end projected beyond the outer edge of the angle between the two arms of the square and also adapted to be moved back in said groove, means for limiting the longitudinal movement of the rule in both directions, and a flexible tape-measure loosely connected at one end to said square at a point adjacent the inner angle thereof.

In testimony whereof I have hereunto set my hand in presence of two subscribing witnesses.

IGNATIUS GERACI.

Witnesses:
J. JEROME LIGHTFOOT,
JAMES L. CRAWFORD.